United States Patent

[11] 3,614,459

[72] Inventor Fred A. Watson
 1806 North 15th st., Boise, Idaho 83207
[21] Appl. No. 91,316
[22] Filed Nov. 20, 1970
[45] Patented Oct. 19, 1971

[54] VEHICULAR REMOTE POWER SUPPLY SYSTEM
 12 Claims, 1 Drawing Fig.
[52] U.S. Cl................................................ 307/10 R,
 219/108
[51] Int. Cl................................................ H02g 3/00
[50] Field of Search.......................................... 219/108;
 320/32; 307/10 BP, 10 R, 10 AT, 66; 290/1

[56] References Cited
UNITED STATES PATENTS
2,976,424 3/1961 Anderson...................... 307/10 R Primary Examiner—Herman J. Hohauser
Attorney—Lawrence E. Laubscher ABSTRACT: An improved fail-safe vehicular remote power supply system that is automatically operable to produce from the conventional dynamo of a vehicle a relatively high direct current output voltage that is suitable for operating conventional welding apparatus, for charging a battery or for inversion to a high alternating current voltage.

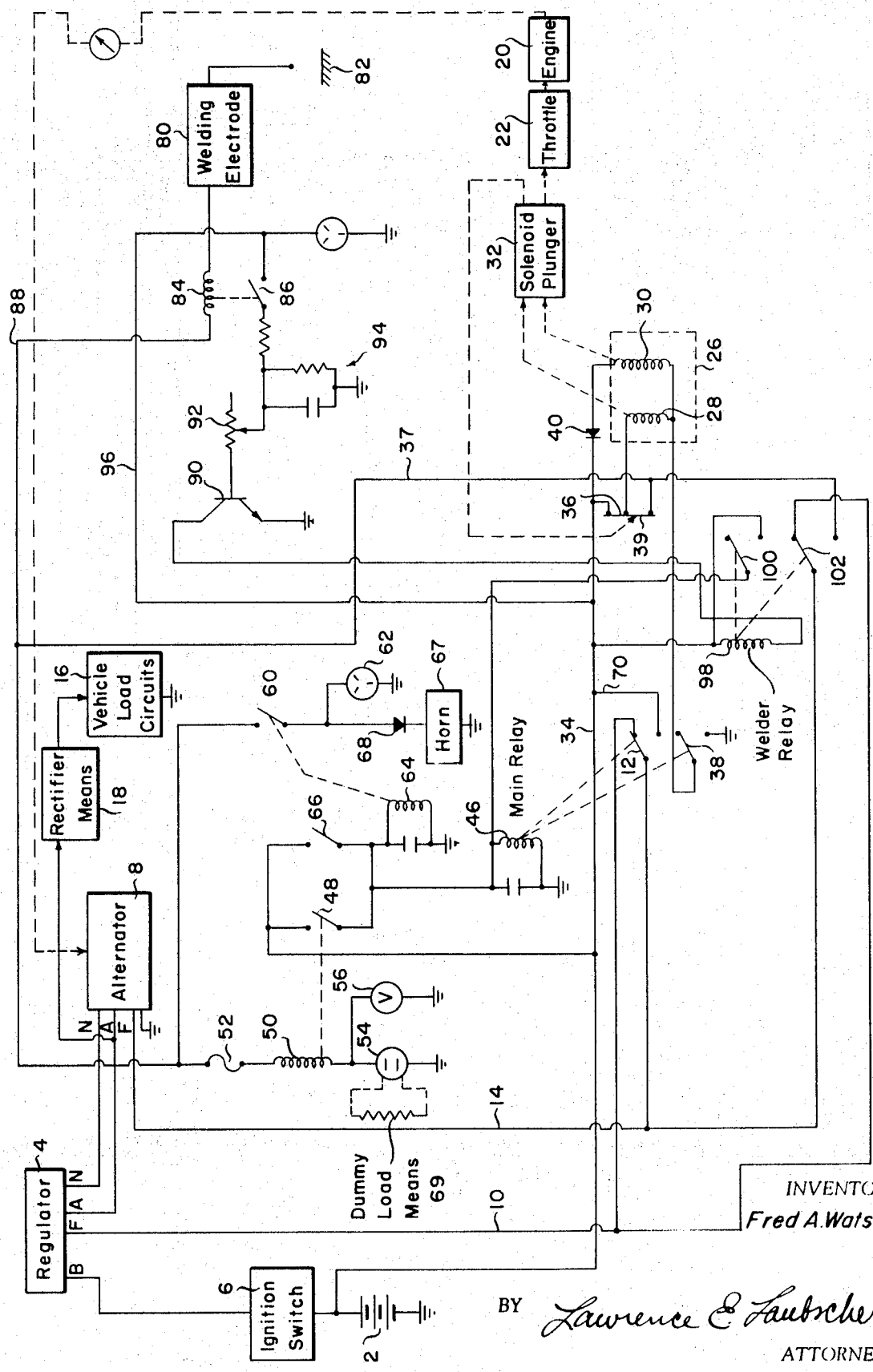

3,614,459

VEHICULAR REMOTE POWER SUPPLY SYSTEM

Various types of remote or emergency power supply systems operable off of the conventional electrical system of an automotive vehicle have been proposed in the patented prior art. In the patents to Burch U.S. Pat. No. 3,293,443; Schneider U.S. Pat. Nos. 3,456,119 and 3,471,706; and Chilton et al., U.S. Pat. No. 3,497,709, various types of vehicular power supply systems are disclosed for operating power handtools or accessories, for charging storage batteries, or for converting, inverting or varying the magnitude of the voltage produced by the dynamo of the vehicle. As evidenced by the patents to Brown, U.S. Pat. No. 1,528,364; McEniry, U.S. Pat. No. 2,182,030; and Anderson, U.S. Pat. No. 2,976,424, it has been proposed to supply electrical power from the vehicle electrical system to welding electrode means, use being made of solenoid means to advance the throttle to increase the engine speed and thereby drive the dynamo at a higher generating speed.

In general, the known auxiliary vehicle power supply systems are of relatively complex construction and require closure of a manual switch to initiate system operation. This switch usually is operable to break the electrical connection between the output post of the dynamo and the vehicle battery, thereby permitting the dynamo output voltage to be elevated to the desired voltage by appropriate regulation of the speed of the dynamo. One hazard presented by such a system is that damage of the dynamo and associated components will occur in the event the switch is left in the operating position without an electrical load being placed across the dynamo. More particularly, most dynamos in modern day vehicles generate an alternating current voltage that is rectified by rectifier means to a direct current voltage for use by the vehicle systems. Consequently, unless there is a load across the dynamo when it is electrically excited and is producing any appreciable amount of current, the diodes are heated past their limit and burn out.

Another disadvantage of several of the prior semiautomatic vehicular power supply systems is that some type of vacuum-operable means are commonly used to advance the throttle. These types of systems are expensive to install, and a small leak in the vacuum line will render them totally inoperable. A further drawback of the known systems is the requirement for provision of a fuse in one side of the high-voltage circuit to prevent overloading of the dynamo, thereby eliminating the dynamo from use as a source of power for a maximum amperage welder or battery charger. The present invention was developed to provide an improved vehicular remote power supply system that avoids the above and other drawbacks of the known power supply systems.

The primary object of the present invention is to provide a vehicular remote power supply system that is operable to drive the vehicle alternator at an increased speed for generating high-voltage direct current power that may be utilized for charging a storage battery, for operating welding equipment or for conversion to alternating current power by silicon controlled rectifier means. The invention is characterized by the provision of fail-safe main relay means that are operable to isolate the regulator from the field terminal of the alternator and to connect a proper excitation voltage to the field terminal of the alternator. The main relay means further operates the solenoid means to effect an increase in engine speed, whereby the alternator speed is increased to generate the desired high direct current voltage. In one embodiment of the invention, the main relay means is automatically energized by the connection of a dummy load impedance with the armature terminal of the alternator, thereby assuring that the alternator and associated rectifier components will be protected against overload. In a second embodiment, the main relay means is automatically operable by the closure of a welder electrode with a workpiece, said welder electrode means being connected with the armature terminal of the alternator to define the alternator load.

A more specific object of the invention is to connect in parallel with the dummy impedance means a manually operable battery charging circuit, alarm means being provided to ensure that the battery-charging cables are connected with the proper polarity.

A further object of the invention is to provide an automatic welding system of the type described above including time delay means for energizing welder relay means to connect the alternator field for self-excitation and to operate the main relay means for producing the high driving speed engine operation.

Other objects and advantages of the invention will become apparent from a study of the following specification when viewed in the light of the single FIGURE of the accompanying drawing, which discloses a schematic electrical diagram of the vehicular remote power supply system.

Referring now to the drawing, the conventional vehicle battery 2 is connected with the battery terminal B of the regulator 4 via the ignition switch 6. The regulator includes also armature and neutral terminals A and N that are directly connected with the corresponding terminals of the conventional vehicle alternator 8, and a field terminal F that is normally connected with the alternator field terminal via conductor 10, a two-position first field switch 12, and conductor 14. The armature terminal of the alternator supplies power to the vehicle load circuits 16 via rectifier means 18 arranged either within or separate from the alternator. The alternator 8 is driven by the internal combustion engine 20 the speed of operation of which is controlled by the throttle means 22.

In accordance with the present invention, means responsive to a demand for high-voltage power are automatically operable to short out the regulator field control of the alternator and to increase the operating speed of the engine, thereby to drive the alternator at a higher generating speed. More particularly, solenoid means 26 including a pull-in coil 28, a hold-in coil 30 and a solenoid plunger 32 as provided for operating the throttle control 22 to increase the engine drive speed. Power is supplied to one end of the solenoid pull-in coil 28 from battery 2 via conductor 34 and the normally closed three-pole pull-in switch 36, and the other end of the pull-in coil is connected with ground via the normally open ground switch 38. The alternator armature terminal A is connected with the DC voltage source via conductor 37 and armature switch 39 (which comprises another pole of the pull-in switch 36). The series branch including hold-in coil 30 and diode 40 are connected in parallel across the pull-in switch 36 and coil 28.

The first field switch 12 and the ground switch 38 are operable by the normally deenergized main relay 46 that is connected with the DC voltage source via the normally open relay switch 48. Switch 48 is operable by the actuating coil 50 that is connected at one end with the armature terminal of alternator 8 via fuse 52, the other end of the actuating coil being connected with ground via the dummy load outlet receptacle 54. Voltmeter means 56 are provided for reading the high direct current output voltage appearing at the receptacle 54.

Connected at one end with the armature terminal of the alternator via normally open battery charging switch 60 is the battery-charging outlet receptacle 62 the other end of which is connected with ground. The switch 60 is operable by the normally deenergized coil 64 that is connected with the DC voltage source via manual switch 66. Audible alarm 67 and diode 68 are connected across the outlet receptacle 62 to provide an audible alarm if the battery cables should be inadvertently reversed.

The operation of the system thus far described is as follows. Assume that a battery to be charged is connected by suitable cable means to the battery-charging outlet receptacle 62, and that a suitable dummy load 69 (such as a 100-watt resistor) is connected with the actuating receptacle 54. Actuator coil 50 becomes energized to close switch 48, whereupon main relay 46 is energized to close ground switch 38 to energize solenoid pull-in coil 28, and first field switch 12 is operated to the second position to isolate the regulator field terminal and to connect the alternator field terminal directly with the DC source via conductor 14, switch 12, and conductors 70 and 34. Owing to the energization of pull-in coil 28, solenoid plunger 32 is displaced from its deenergization position toward its fully energized position, thereby advancing the throttle to increase engine driving speed and, consequently, to increase the speed at which the alternator is driven. When the solenoid plunger reaches the fully energized position, pull-in switch 36 and armature switch 39 are opened by the plunger, thereby deenergizing the pull-in coil 26 and isolating the alternator armature terminal from he DC voltage source. The solenoid plunger is now maintained in the fully energized position by the hold-in coil 30 that is energized via diode 40. Manual switch 66 is closed to energize coil 64 and hereby close switch 60, and, assuming that the battery cables are correctly connected, the audible alarm 67 remains silent.

Owing to the high speed at which the alternator 8 is driven by the engine, a relatively high-rectified DC voltage is supplied to the receptacle 62 via switch 60, thereby charging the battery.

In accordance with a major feature of the invention, a welding electrode 80 is provided for engagement with a workpiece 82, said welding electrode being connected with the armature terminal of the alternator via timing coil 84 and conductor 88. When the welding electrode 80 is brought into engagement with the workpiece 82, timing coil 84 is energized to effect closure of the normally open timing switch 86, whereupon the control electrode of the normally nonconductive transistor 90 is connected with the DC voltage source via adjustable resistor 92, RC timing circuit 94, switch 86 and conductor 96. When transistor 90 becomes conductive, welder relay 98 becomes energized to operate the welder switch 100 to connect the main relay 46 with the DC source, and to operate the two-position second field switch 102, whereupon the regulator field terminal is isolated and the alternator field terminal is connected with the alternator armature terminal via conductor 14, switch 102, and conductor 37. Alternator 8 is now in a self-excited condition, and owing to the closure of ground switch 38, the solenoid means 26 is energized to operate engine 20 at the high driving speed, whereupon alternator 8 is driven to supply the high welding voltage to the welding electrode means. When the plunger reaches the fully energized position, the armature switch 39 is opened to isolate the alternator armature terminal from the DC voltage source, and to deenergize the pull-in coil 28. Preferably the solenoid plunger is connected with the throttle by means of a motorcycle-type cable with screw adjustments at both ends, whereby the speed of the alternator may be regulated to make it a low or high output charger. In the case of a high DC power unit, one thereby has the ability to set the voltage as desired.

When the welding process is initiated, the striking voltage is lowered to about 20 volts by the load placed on it, thereby raising the current flow through the self-excited dynamo. The delay system is provided since a prolonged voltage of more than 30 volts would be harmful to the field of the dynamo, and further to assist in the striking of the welding arc. The welding relay 98 stays closed until the capacitor in the delay network 94 is discharged, the time normally being adjustable by variable resistor 92 between 1 and 7 seconds.

It is important to note that while the high DC power supply and welding systems are fully automatic, the battery-charging system is intentionally designed for manual operation because of the danger of an arc igniting the hydrogen that is formed round a battery, and because of the damage that results from hooking up a battery with the wrong polarity.

While it is believed that the best form and embodiment of the invention has been illustrated and described, it will be apparent to those skilled in the art that various changes and modifications may be made without deviating from the inventive concept.

What is claimed is:

1. In a vehicular remote power supply adapted for use with a vehicle electrical system including a direct current voltage source; a dynamo having armature and field terminals; and regulator means having a field terminal, a battery terminal connected with said voltage source, and an armature terminal connected with the dynamo armature terminal, said dynamo being driven by the throttle-controlled internal combustion engine of the vehicle; the improvement which comprises solenoid means (26) including a plunger (32) connected with said throttle and having a normal deenergized position in which said engine is operated at an idling speed, pull-in coil means (28) for displacing said plunger toward an energized position in which said throttle operates said engine at a high running speed, and hold-in coil means (30) for maintaining said plunger in the energized position;

means for energizing said solenoid means, including a normally closed plunger-operated pull-in switch (36) for connecting one end of said pull-in coil with said voltage source, and a normally open ground switch (38) connecting the other end of said pull-in coil with ground, said pull-in switch being opened when the plunger is in the fully energized position, said hold-in coil being connected in parallel across the series branch including said pull-in switch and said pull-in coil, said hold-in coil being operable to maintain the plunger in the energized position when said pull-in switch is opened by said plunger;

a first two-position field switch (12) normally having a first position connecting said alternator field terminal with said regulator field terminal, said field switch being operable to a second position to connect said alternator field terminal with said voltage source;

a normally closed plunger-operated armature switch (39) normally connecting said alternator armature terminal with said voltage source, said plunger-operated switch also being opened when said plunger is in the energized position;

normally deenergized main relay means for closing said ground switch and for operating said first field switch from the first position to the second position;

and means for energizing said main relay means, whereby said solenoid means are activated to effect high-engine driving speed and said alternator is operated to supply high direct current voltage at the alternator armature terminal.

2. Apparatus as defined in claim 1, wherein said pull-in switch and said armature switch are combined to define a three-pole switch the contacts of which are simultaneously opened by said plunger when said plunger is in the energized position.

3. Apparatus as defined in claim 1, wherein said means for energizing said main relay means includes normally open main relay switch means (48) for connecting said main relay means with said voltage source, and means for closing said main relay switch means including an actuating coil (50) connected at one end with the alternator armature terminal, and actuator means for connecting the other end of said actuating coil with ground, thereby providing fail-safe operation of the system.

4. Apparatus as defined in claim 3, wherein said actuator means comprises high-voltage impedance load means (69), whereby a protective load is always connected with the armature terminal of the alternator.

5. Apparatus as defined in claim 1, wherein said means for energizing said main relay means comprises a normally open welder switch (100) for connecting said main relay terminal with said voltage source;

a second two-position field switch (102) having a first position normally connecting said alternator field terminal with said regulator field terminal, and a second position for connecting said alternator field terminal with said alternator armature terminal, thereby effecting self-excitation of said alternator;

welding electrode means (80) connected at one end with said alternator armature terminal, said welding electrode means being arranged to engage a workpiece to be welded; and means responsive to engagement of said welding electrode means with said workpiece for closing said welder switch and for operating said second field switch from said first position to said second position, whereby said alternator is self-excited and is driven at a high velocity by said internal combustion engine.

6. Apparatus as defined in claim 5, wherein said means for closing said welder switch and for operating said second field switch comprises a normally deenergized welder relay means (98), and means for energizing said welder relay means.

7. Apparatus as defined in claim 6, wherein said welder relay means includes a semiconductor device (90) including a pair of power circuit electrodes for connecting said welder relay with said voltage source, said device including also a control electrode; and further including timing circuit means for connecting said control electrode with said voltage source, said timing circuit means including a normally open timing switch (86), and a resistance-capacitance network (94) connected in series with said timing switch.

8. Apparatus as defined in claim 7, and further including timing relay means (84) connected in series with the welding electrode for closing the timing switch when the welding electrode is brought into grounded contact with the workpiece.

9. Apparatus as defined in claim 7, wherein at least one resistor (92) of the resistance-capacitance network is variable to adjust the time constant of said timing delay network.

10. Apparatus as defined in claim 3, and further including a pair of battery-charging terminals (62) adapted for connection with the terminals of a battery to be charged, and further including means including a normally open battery charging switch (60) for connecting said battery charging terminals between the armature terminal of said alternator and ground, respectively.

11. Apparatus as defined in claim 10, and further including a series branch including an alarm (67) and a diode (68) connected in parallel across said pair of battery charging terminals.

12. Apparatus as defined in claim 10, and further including means for closing said battery-charging switch including a normally deenergized relay (64), and manually operable switch means (66) for connecting said relay with said direct current voltage source.